United States Patent [19]

Leech et al.

[11] Patent Number: 4,754,410

[45] Date of Patent: Jun. 28, 1988

[54] AUTOMATED RULE BASED PROCESS CONTROL METHOD WITH FEEDBACK AND APPARATUS THEREFOR

[75] Inventors: William J. Leech, Monroeville, Pa.; Thomas N. Dean, Chapin, S.C.

[73] Assignee: Westinghouse Electric Corp., Pittsburgh, Pa.

[21] Appl. No.: 826,524

[22] Filed: Feb. 6, 1986

[51] Int. Cl.[4] ...................... G06F 15/18; G05B 13/02
[52] U.S. Cl. ................................... 364/513; 364/148; 364/151; 364/158; 364/165
[58] Field of Search ............... 364/164, 165, 158, 148, 364/468, 513, 200 MS, 900 MS, 300; 364/151

[56] References Cited

U.S. PATENT DOCUMENTS

| | | | |
|---|---|---|---|
| 4,328,556 | 5/1982 | Abe et al. | 364/900 |
| 4,349,869 | 9/1982 | Prett et al. | 364/165 |
| 4,458,321 | 7/1984 | Whitney et al. | 364/165 |
| 4,459,259 | 7/1984 | Colley | 364/492 |
| 4,472,770 | 9/1984 | Li | 364/148 |
| 4,517,468 | 5/1985 | Kemper et al. | 364/492 |
| 4,563,735 | 1/1986 | Hiroi et al. | 364/165 |
| 4,591,983 | 5/1986 | Bennett et al. | 364/468 |
| 4,595,982 | 6/1986 | Burt | 364/300 |
| 4,628,435 | 12/1986 | Tashiro et al. | 364/468 |
| 4,642,782 | 2/1987 | Kemper et al. | 364/513 |
| 4,644,479 | 2/1987 | Kemper et al. | 364/513 |
| 4,649,515 | 3/1987 | Thompson et al. | 364/900 |
| 4,656,603 | 4/1987 | Dunn | 364/900 |
| 4,658,370 | 4/1987 | Erman et al. | 364/513 |
| 4,670,848 | 6/1987 | Schramm | 364/513 |
| 4,675,829 | 6/1987 | Clemenson | 364/513 |

OTHER PUBLICATIONS

"The Use of Expert Systems in Industrial Control", Measurement and Control, vol. 17, No. 11, Dec./Jan. 1984-1985, pp. 409-413, Dorking, GB, B. Knight et al.
Quinlan, J. R., "Machine Learning, An Artificial Intelligence Approach", Tioga Publishing Co., Palo Alto, CA, 1983, pp. 463-382.
Hill et al., :Plant Experimentation (PLEX), Journal of Quality Technology, vol. 7, No. 3, Jul., 1975, pp. 115-121.
Brownlee, "The Principles of Experimental Design", Industrial Quality Control, Feb., 1957, pp. 12-20.
Sullivan, "Reducing Variability: A New Approach to Quality", Quality Progress, Jul., 1984, pp. 15-21.

Primary Examiner—Jerry Smith
Assistant Examiner—John R. Lastova
Attorney, Agent, or Firm—D. C. Abeles

[57] ABSTRACT

The present invention provides a rule based process control system which automatically learns how to control a process by inducing control rules from the process as it changes. During process operation data samples from the process are collected which include the controllable variables in the process along with the dependent variable (goal or goals) of the process. If a sample is not predicted by the current rules that control the process, new rules are induced from the new sample and previously collected samples by creating a decision tree. The controllable variable having the greatest effect on the goal occupies the highest tree node. New rules are produced from the decision tree which predict process behavior based on the new and old samples. From these new rules, control rules which satisfy system constraints and improve on the goal(s) are selected. The control rules are then used to control the process until another sample is not predicted by the new rules. In this manner, data samples are collected and saved which represent the possible states of the process and from which rules for controlling the process are produced. As the sample set grows, the domain in which the process can be predictably controlled also grows. If the sample set is allowed to grow infinitely, all the rules for controlling the system can be produced. As a result, the system learns how to control the process under varying conditions and induces rules that optimize the process toward the desired goal.

13 Claims, 10 Drawing Sheets

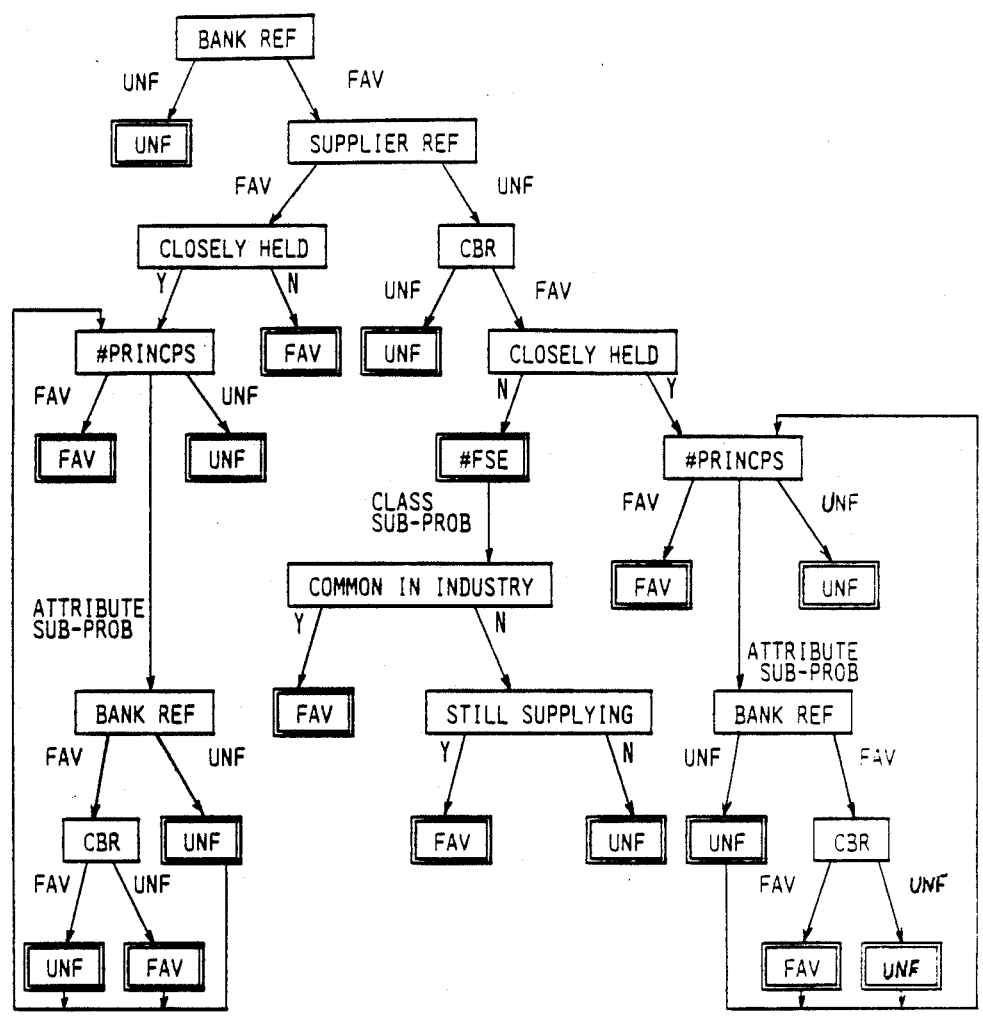
FIG. II

AUTOMATED RULE BASED PROCESS CONTROL METHOD WITH FEEDBACK AND APPARATUS THEREFOR

BACKGROUND OF THE INVENTION

1. Field of the Invention

The present invention is directed to an automated rule based process control method and apparatus that includes feedback and, more particularly, to a system in which rules concerning the operation of a process are inferred from data samples of the process being controlled, the rules are used to move the process toward the desired goal and as the process operates new data samples allow the inference of new rules, so that the process is automatically optimized and the rules for controlling the process are automatically generated.

2. Description of the Related Art

Process control when attempting to optimize toward a desired goal has, been characterized by statistical analysis methods which analyze the behavior of a process and attempt to predict process behavior when controllable variables of the process are modified. In processes such as performed in a chemical plant, the control variables relate to the chemical process under consideration such as water temperature and chemical flow rates. In a process such as a commercial or individual loan analysis system, the variables relate to economic considerations such as whether a bank reference is good or bad.

In prior art plant process control systems, plant experimentation programs have been used to find out what happens to a system when it is perturbed to allow characteristics which can lead to optimization to be discovered. Plant experimentation is a form of controlled interference used to learn more about the process without radically upsetting it. One approach to plant experimentation involves executing one or more sets of experiments in a limited amount of time to get process improvement information on selected sets of variables. The experimental case history is then analyzed using statistical analysis techniques such as a regression or correlation analysis to determine which variables significantly control a desired output such as yield. These prior art methods are very unwieldy in practice and result in an extended amount of time elapsing between the experiment and a determination to adjust the variables which control the desired output.

SUMMARY OF THE INVENTION

An object of the present invention is to provide a process control system which learns how to obtain a desired goal or set of goals from operating the process to be controlled.

Another object of the present invention is provide a system which includes feedback to a rules inference system to induce new rules for controlling the process toward the desired goal or goals.

An additional object of the present invention is to provide a rule set for controlling a process that has plural rules thereby providing multiple control strategies for the process.

A further object of the present invention is to provide a control algorithm which is automatically guided by the process being controlled.

A still further object of the present invention is to provide control rules which automatically change with time allowing the system to adapt to wear characteristics of the process, modifications or improvements in the process, a change in economic factors governing the process such as material costs, changes in the constraints such as the operating range of control variables, changes in external conditions and changes in the goals of the process without requiring that a new control system be produced from scratch.

Yet another object of the present invention is to provide a control algorithm which can produce control rules even when data are missing.

An object of the present invention is to provide the ability to control a process having both numeric and symbolic controllable variables or attributes.

An additional object of the present invention is to provide a control system that can balance plural goals.

Another object of the present invention is to provide a process control system with easily modifiable rules.

A still further object of the present invention is to provide a process control system that can control and balance plural outputs.

An object of the present invention is to provide a control system that does not require knowledge of the physics of the system being controlled.

The present invention obtains the above objects by providing a rule based process control system which learns how to control a process by inducing control rules from the process as it changes. During operation of the process, data samples are collected which include the controllable variables in the process along with the dependent variables (goals) of the process. If a sample is not predicted by the current control rules, new rules can be induced, depending on new rules production criteria, which predict the behavior of the process based on the new samples and the previous samples from which the current rule was produced. The new rules are then used to control the process until another sample is not predicted by the new rules. In this manner, data samples are collected and saved which represent the possible states of the process and from which rules for controlling the process are produced. As the sample set grows, the domain in which the process can be predictably controlled also grows. If the sample set is allowed to grow to the entire finite set which is representative of the total domain of system operation, all the rules for controlling the system can be produced. As a result, the system learns how to control the process under varying conditions and induces rules that optimize the process toward the desired goal.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 is a decision tree for a credit evaluation process at a bank from which rules for granting a loan are produced.

DESCRIPTION OF THE PREFERRED EMBODIMENTS

Figure 1:
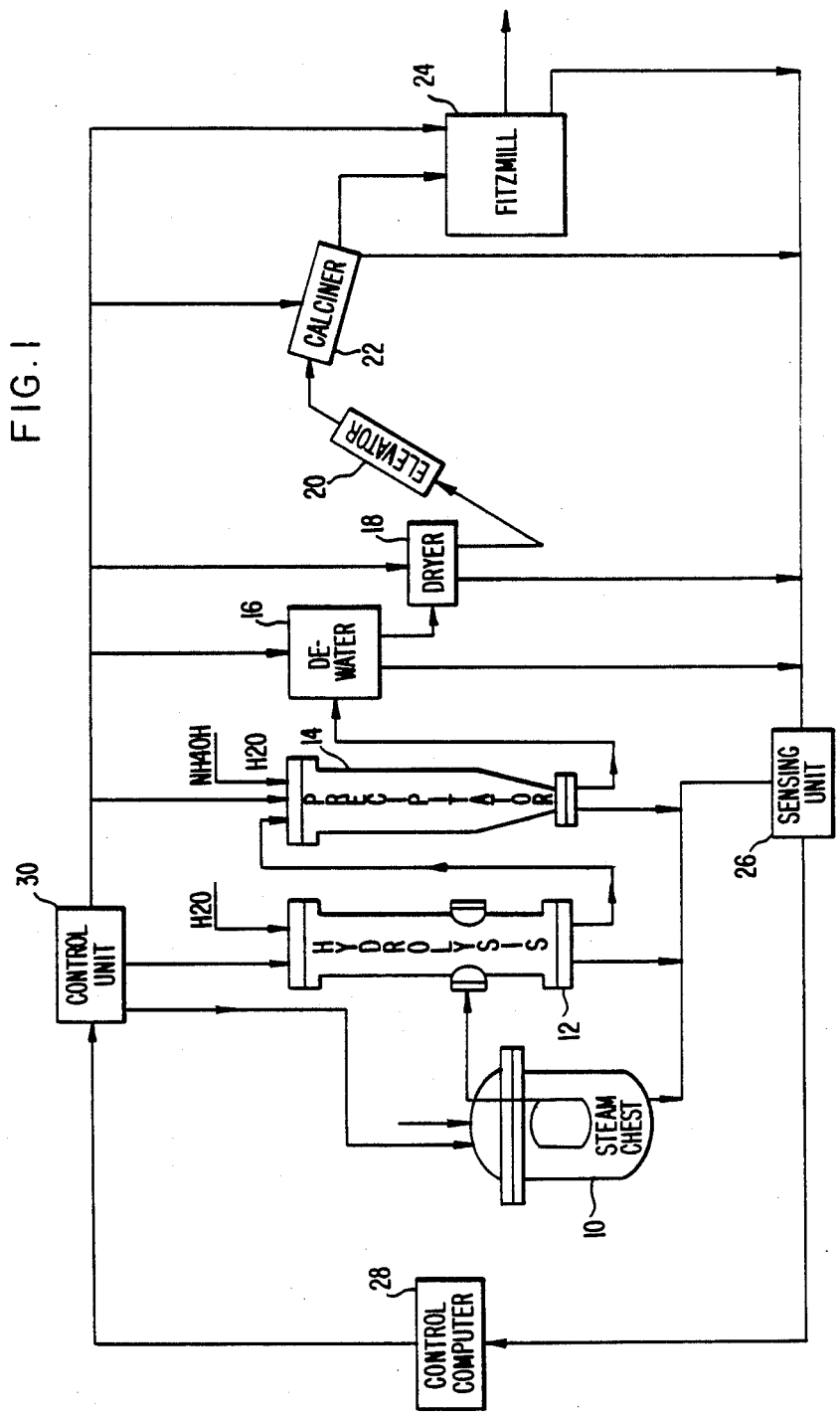
FIG. 1 illustrates an industrial process to which the present invention can be applied.

A typical application of the present invention to a chemical plant is illustrated in FIG. 1. In this system, controllable units 10-24 in the process are monitored by a sensing unit 26 which samples various controllable variables associated with the process such as temperature and flow. The sensing unit 26 sends the data samples to a control computer 28 which produces and transmits control values to a control unit 30 using rules induced from the process. The control unit 30 adjusts the controllable variables associated with the process. Process control systems such as depicted in FIG. 1 are very common, and a sensing unit 26 and a control unit 30 suitable for a particular process can be provided by one of ordinary skill in the art.

Figure 2:
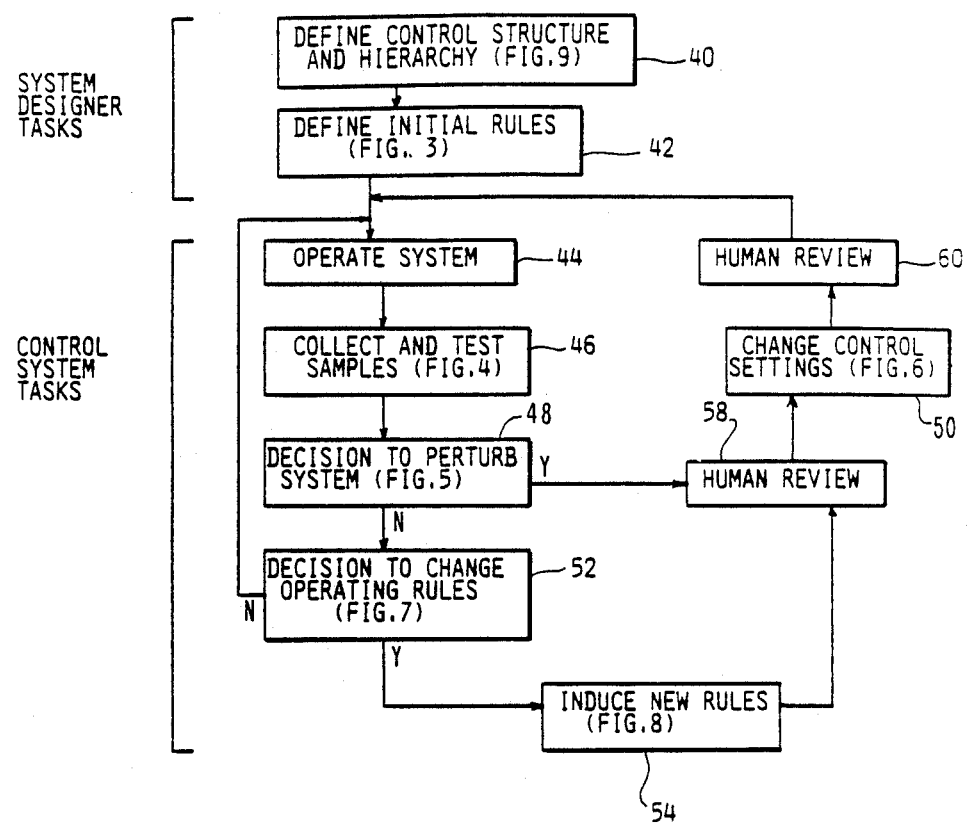
FIG. 2 depicts the development of the control rules for a process in accordance with the present invention.

FIG. 2 depicts both the system designer tasks and control system tasks in developing and controlling a process in accordance with the present invention. An important aspect of controlling a process is properly defining the control structure and hierarchy. The control structure and hierarchy define the controllable variables and their position in the process with respect to the goal or goals of the process. For example, in a chemical process, temperature and flow rate can be the controllable variables while high yield and consistency in product quality can be the goals. Once the designer defines the control structure and hierarchy, the initial rules for operating the system must be defined 42. Development of the initial rules will be discussed in more detail later.

Once the initial rules are defined, the control system itself takes over and the process is operated 44 in accordance with the current rules. During operation, data samples are collected and tested 46 against the current rules. It is also possible to perturb the system 48, an event which can occur due to normal drift of the controllable variables or can be an intentional adjustment or change 50 in one of the controllable variables causing the process to change. If such a perturbation loop is executed, the system will again be operated 44 for a period of time during which samples are collected and tested. If the system is not perturbed, a decision must be made 52 whether to change the operating rules or, in other words, substitute a new set of operating rules. For example, one decision making strategy is to change the rules each time a sample is not predicted by the current control rules. Another strategy is to change the rules when a specified error threshold is exceeded. The threshold could be defined as the percent of samples not predicted, or when the absolute deviation from the goal exceeds a certain value. To change the rules, new rules are induced 54 from the collection of samples. If the new rules require different controllable variable settings, then the settings must be changed 50. Strategies for changing the control settings will be discussed in more detail hereinafter.

FIG. 2 also includes optional stages 58 and 60 at which human review can be provided to prevent a catastrophic system change. If the system is critical in nature or includes a long response time the human review stages could and should be added. In an automated process as intended by present invention, in the human review stages the system would notify the operator that a change is recommended by printing out or displaying the various changes which will occur in the system if the operator allows that the system to change automatically.

Figure 3:
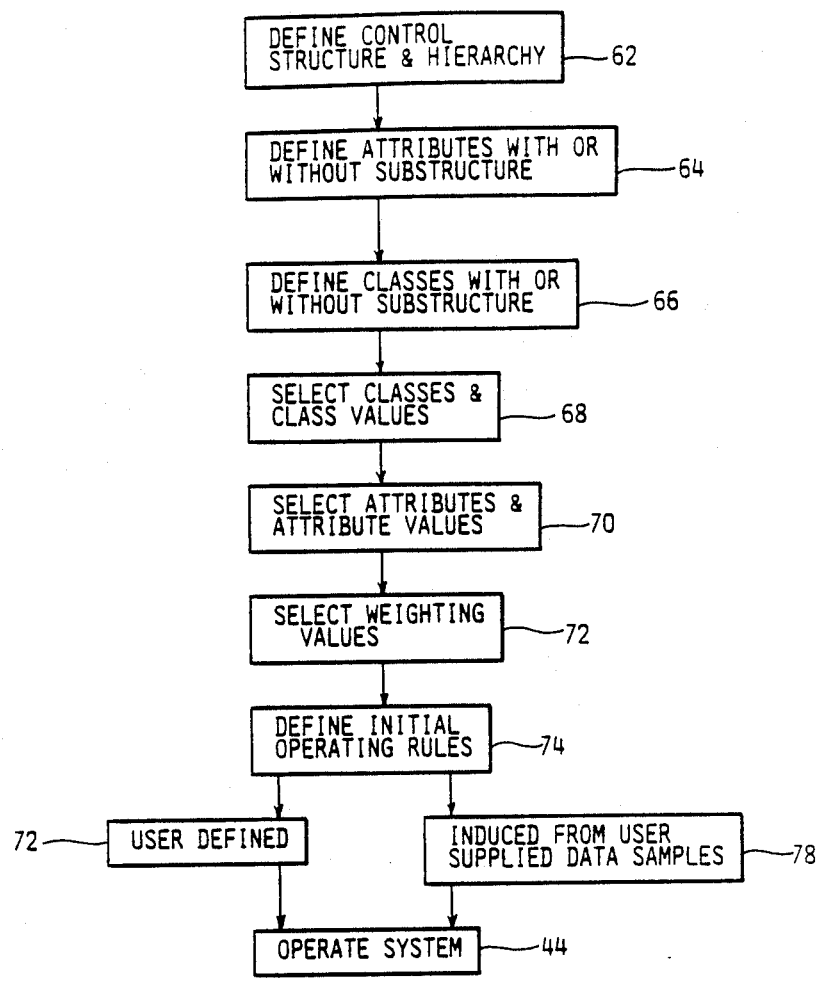
FIG. 3 illustrates the steps performed by a system designer during development of initial control rules.

FIG. 3 illustrates the system designer tasks of FIG. 2 in more detail. Once the control structure and hierarchy of the system are the defined 62 then the attributes and classes for the system must defined, selected and a weight value for each selected. Classes and attributes must be properly defined 64 and 66 with respect to their relationship to the structure being controlled and the hierarchy of the system. A class represents a goal or an answer that is to be produced by the process such as yield in a chemical process control environment or whether or not to grant a loan in a financial analysis environment. Attributes are the independent variables which determine the value of the class or dependent variable, such as temperature and flow rate in a chemical process and whether bank references are favorable in a financial situation. All important attributes or controllable variables and class values or goals must be selected 68 by the user or systems designer. In a situation where there is a high degree of uncertainty concerning whether a particular controllable variable affects the output or goal, all controllable variables should be selected as attributes. An interesting benefit of the present invention is that attributes which are not important to obtaining the goal will be automatically identified so that they can be eliminated from the data to be sampled if desired.

It is possible within a particular hierarchy that attributes or class values are determined in accordance with a substructure or subproblem. That is, an attribute may actually be a goal or class value of a previous stage in the process and the attribute or class value would require the solution of a sub-problem to obtain the necessary variable value. If such subproblems exist, these must also be defined.

In inducing the control rules in accordance with the present invention, a decision tree, which tends to be the minimum size decision tree, is generated; however, such a minimum size tree may be undesirable because of cost or other considerations. For example, in a chemical process, the minimum size tree may always require that the temperature of a fluid be kept very high to obtain a satisfactory yield and this will raise fuel bills. In contrast, a non-minimum tree may allow lower temperature but more of an expensive catalyst thereby reducing overall costs. By attaching weights to attributes, cost or time considerations can be introduced into the rules induction process to find a minimum decision tree which reflects such considerations. A high weight causes an attribute to be more likely to be selected as a high node in the decision tree during the induction process. If minimum cost rules are desired, controllable variables or attributes which have the lowest costs should be given higher weights.

Once the above-listed values are selected the initial operating rules can be defined by referring to process control history from which the designer himself can produce 76 the rules. The initial rules can also be developed from physical constraints such as laws of nature. However, more efficiently, as will be discussed hereinafter, the initial rules can be induced 78 from historical data or samples of the controllable variables or attributes of the process from the recent past, such as during a start-up or debug phase of process development. As a result, the system designer need not be an expert in the process.

Figure 4:
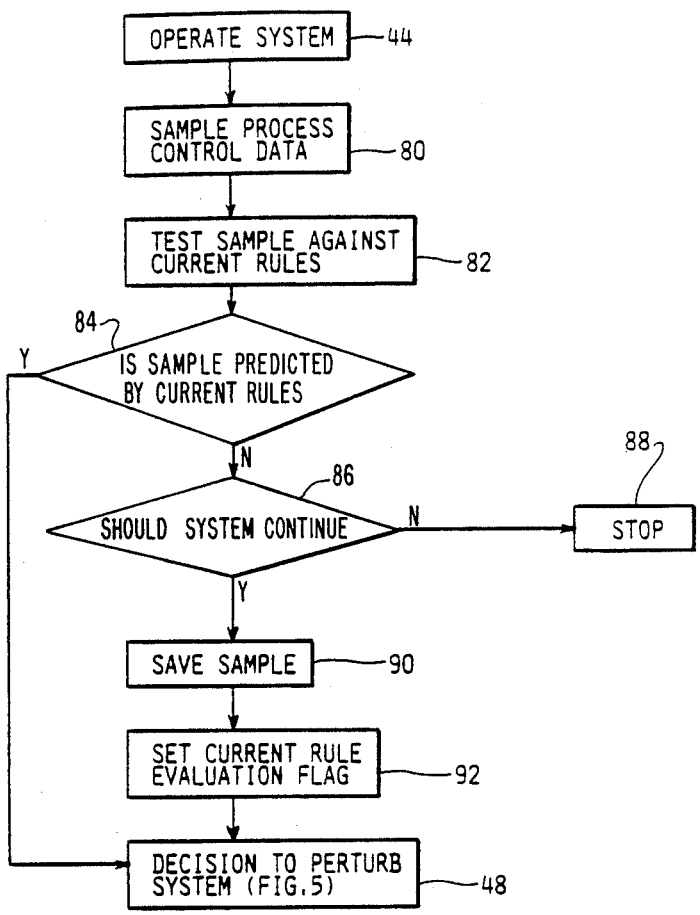
FIG. 4 is a flowchart of the control system task associated with collecting and testing samples.

FIG. 4 illustrates the process of collecting and testing samples. First, the input variables of the process and the output goal is sampled 80 by a sensing unit 26, as depicted in FIG. 1 for a chemical process or a case history of a loan transaction is selected in a loan analysis system. The sample is tested 82 against the current rules and if the sample is predicted by the current rules, the process continues. If the sample is not predicted 84 by the current rules a decision can be made to discontinue the system. Such a decision to stop the process would be made, for example, when the sample indicates that the process has reached a point where an alarm should be issued and the process shut down. If, however, the system should continue, the sample is saved as a part of a sample data set in, for example, an array type structure and a current rule evaluation flag can be set which indicates that a decision needs to be made concerning whether to change the operating rules that is, substitute a new set of operating rules. Once the flag is set the process continues. An alternate sample collection strategy would be to save only those samples which improve toward the goal.

Figure 5:
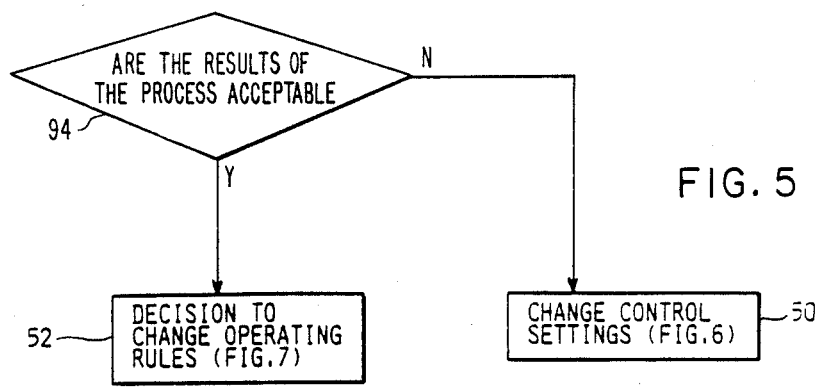
FIG. 5 illustrates the step of determining whether to perturb the system being controlled.

Next, as illustrated in FIG. 5, the decision to perturb the system is made by determining whether the results of the process being controlled are those desired 94. That is, the class value of the current sample is examined to determine whether the goal is being met. This determination can be made based on designer selected criteria such as in a chemical process by determining whether current yield is greater than or equal to the previous sample's yield. That is, the question at this point is whether the system is tracking toward the desired goal. The results may be acceptable but not optimal. If optimal results are desired, then the control settings can be changed. If the results are acceptable, the process moves on to the decision concerning whether to change the operating rules. If the current results are not yet optimum, the control settings are changed. The option also exists to intentionally make small changes in the control settings from the current state to determine if the performance of the system changes. The systematic perturbation of the system may give samples which allow performance to be improved.

Figure 6:
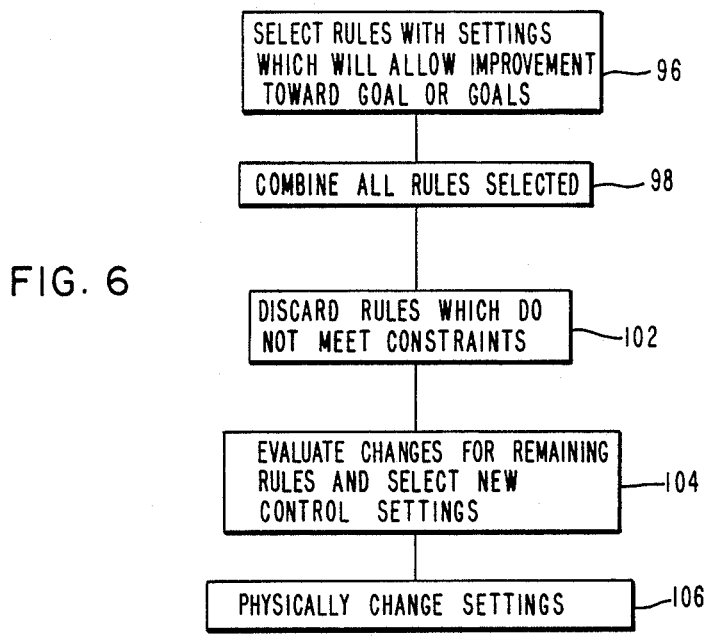
FIG. 6 is a flowchart of the steps taken to change control settings for the process.

FIG. 6 illustrates the process of changing the control settings. First, from the list of rules, the rules which will allow improvement towards the goal or goals are selected 96, thus substituting a new rule for the previous controlling rule. That is, associated with each rule is a class value which will result if the rule is followed. The class value, for example yield, of each rule is compared with the class value of the current sample (current yield) and the rules which will maintain or improve yield, that is, maintain or improve the process toward the goal, are selected. The rules that do not satisfy this criteria can be discarded. Since each class value can represent a different goal (that is, the output for different stages of the process or the satisfaction of plural goals) the rules must be examined to select only those rules which will allow satisfaction of all the goals. These rules are then combined 98. After the rules are combined, the settings for the attributes or dependent controllable variables of each rule are compared 100 with the system constraints. System constraints can be items such as range limits for a particular controllable variable or limitations that prevent simultaneously changing two or more controllable variables. After comparing the settings of the rules with the system constraints, the rules which do not meet the constraints can be discarded 102. Next, the changes dictated by the remaining rules are evaluated and new control settings are selected.

Various strategies are available to the system designer in determining how to evaluate and select new control settings, for example: (a) the control rule and associated settings which will require the minimum change from present conditions can be selected; (b) the control rule which will allow the changes in the minimum time from the present conditions can be selected; (c) the rule which is supported by the most number of data samples set can be selected or (d) some other selection criteria provided by the designer which is dependent on the process being controlled can be selected.

Once the settings are selected, the settings must be physically changed 106 by adjusting the control dependent variables indicated. These adjustments preferably are made by a process control unit 30, as illustrated in FIG. 1, which can control servos which change the position of valves, etc. However, when a system is in the development stages or when the system designer, due to economic or other considerations, chooses not to install a completely automated control system the system can output rule based instructions which tell the process control operator the values for the various controllable variables.

Figure 7:
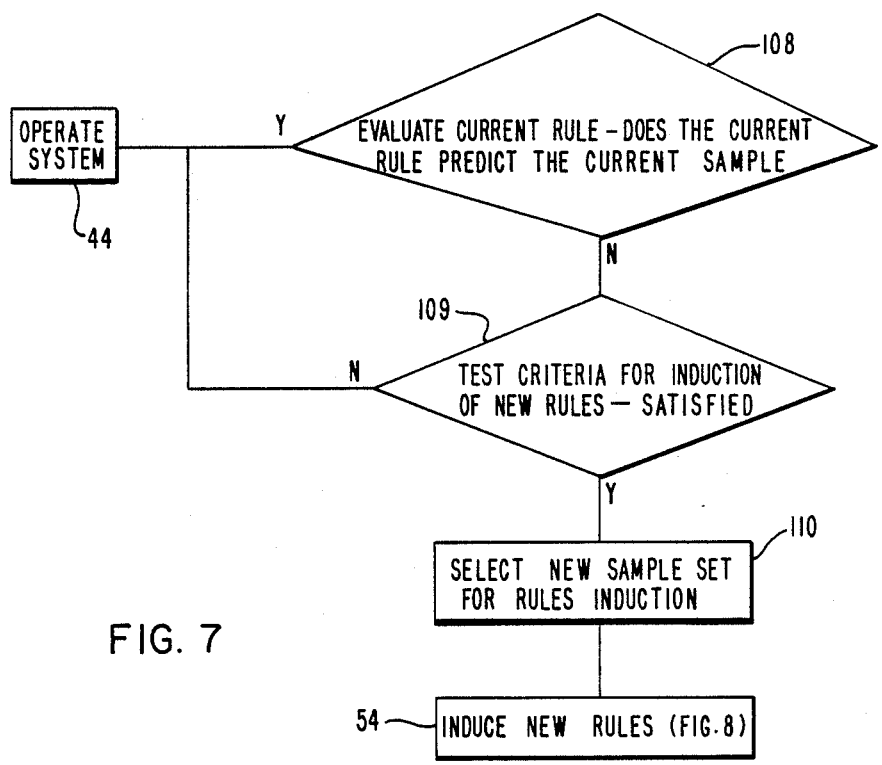
FIG. 7 illustrates the steps in a decision to change the control rules.

If the decision to perturb the system, as previously discussed, is negative, the decision to change the operating rules is made next, as illustrated in FIG. 7. First, the current rule is evaluated 108 by answering the question does the current rule predict the current sample. That is, the decision tree of the current rule is traversed using the current values of the attributes and the current class value or current goal is compared to the class value specified by the rule, and if the current and predicted class values are not coincident the rule does not predict the current sample. If a current rule evaluation flag is used, as illustrated in FIG. 4, the flag only needs to be tested at this stage. If the rule is predicted by the current sample, no further action is taken and process control using the current control settings is continued. Criteria for rules induction should be tested 109. In most situations it may be too costly or time consuming to change the rules when a single sample is not predicted. The rules change criteria may require that several samples be in error, or the magnitude of the error to be above some value, prior to inducing new rules. A user defined function including rule change criteria would be specified to decide when to re-induce the rules. If the current sample is not predicted and the rules induction criteria are satisfied, a new sample set for rule induction may be selected.

Various strategies are also available for selecting the contents of the sample set data base, so that the sample set data base does not grow beyond the storage capability of the computer 28 or the cycle time restraints on process control. For example, the oldest sample or the sample which produces a decision tree branch that minimizes improvement in the goal could be discarded.

Figure 8A:
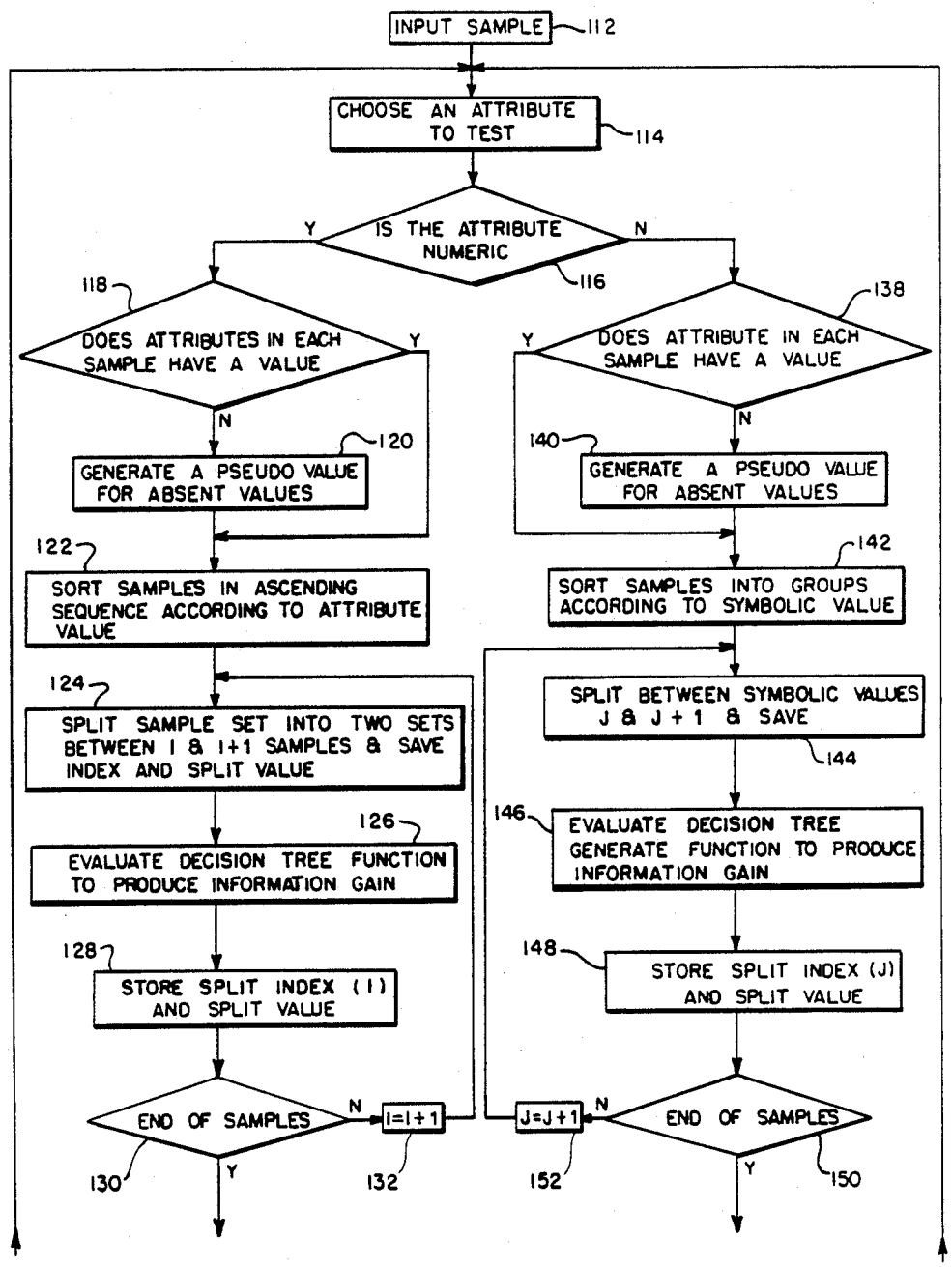
FIG. 8, including 8(A) and 8(B) is a flowchart of the process for creating a decision tree from which rules are produced.
Figure 8B:
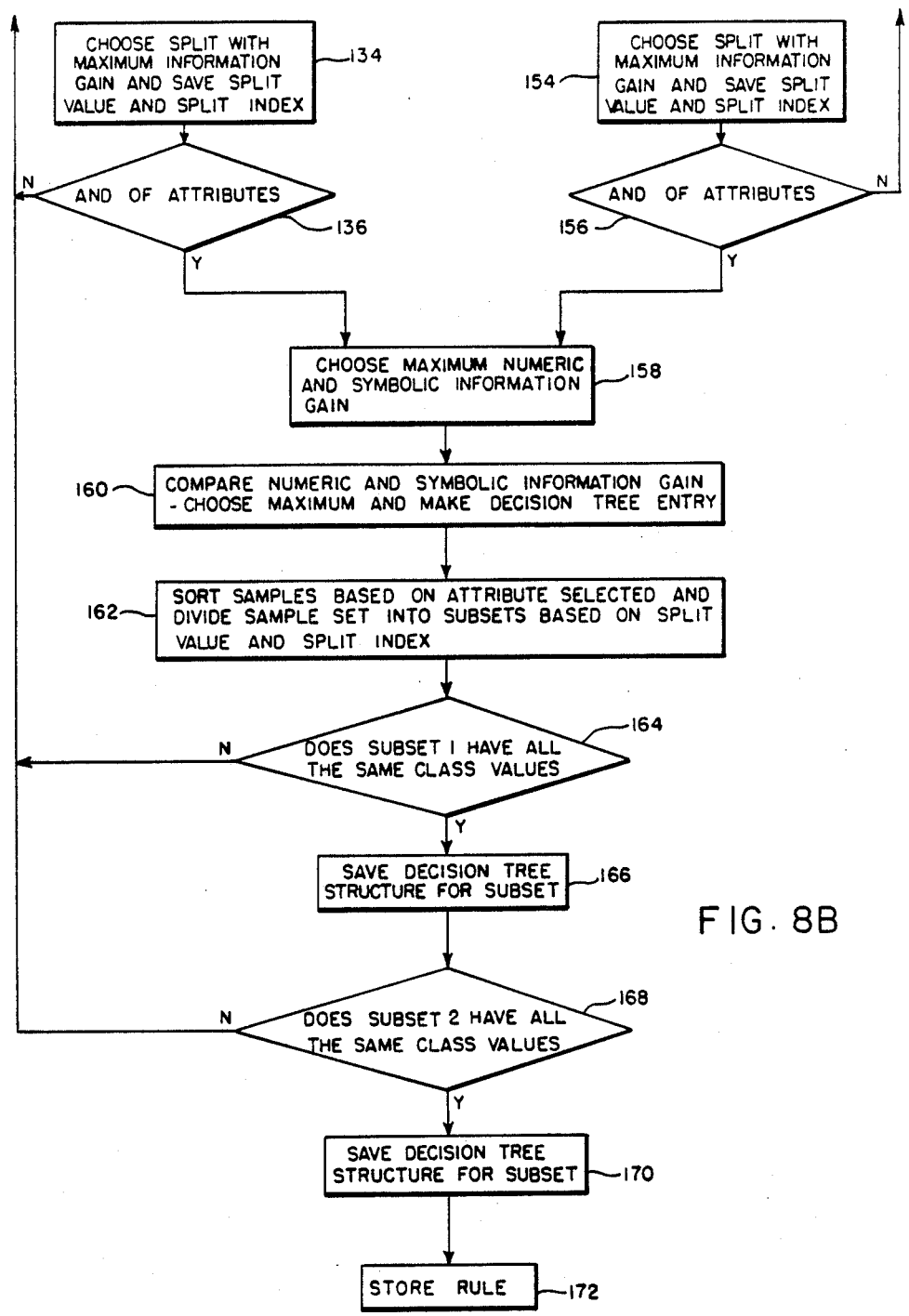

Once the sample set is selected, new rules are induced as illustrated in FIG. 8. First, the samples are input 112 and stored in a data structure, such as an array, matrix or list which is suitable for storing samples having multiple attributes where the samples must be sorted and subdivided during processing. Next, an attribute is chosen 114 for testing to determine whether it is a appropriate split node for the decision tree. The attribute to be tested can be chosen arbitrarily, such as choosing the first attribute in the sample. The attribute is tested 116 to determine whether it is numeric. Assuming that the attribute is numeric, a determination 118 is made concerning whether the attribute has a value in each sample. If each attribute does not have a value, a suitable value for that sample is generated 120 by, for example, averaging the attribute values or randomly picking an attribute value. Another strategy for handling absent values is to create pseudo samples to substitute for the sample with the missing attribute. The missing attribute value for the pseudo samples can be generated based on the distribution of the attribute values for other samples in the sample set or on a distribution such as a bell curve.

The records are sorted 122 in ascending sequence according to the attribute value for the attribute selected, and then the sample set is split 124 into two sets between the first and second samples producing a split value and a split index. Next, an information gain function for creating a decision tree is evaluated 126 to produce the information gain for the split previously selected. The information gain will be used to determine whether the tested attribute is appropriate as the split node for the current level in the decision tree. The calculations necessary to evaluat this preferred function will be discussed in detail later. The resulting information gain along with split values and split index are stored 128. If the last sample has not been reached 130, the index is advanced 132 and the sample set is split between the next two samples and the decision tree generation function is again evaluated. Once the end of the samples is reached, the split which produces the maximum information gain, along with the split value and split index, is saved 134. If the end of the attributes has not been reached 136, then the next attribute is chosen and the process continues again.

After a similar process is performed for each symbolic attribute, the numeric or the symbolic attribute having the highest information gain and the corresponding indices are chosen 158 by comparing the information gain for each attribute. Next, the maximum numeric and symbolic information gain values are compared 160 with each other, the attribute with the maximum is chosen and a decision tree record entry is created. The data structure of the decision tree will be discussed in more detail hereinafter.

After the maximum is chosen, the samples are again sorted 162, based on the selected attribute, into ascending sequence if numeric and according to symbolic name if symbolic. Then the sample set is divided into subsets based on the attribute with the maximum information gain and the corresponding split value and split index. If all the samples in each subset have the same class values, then the decision tree for the subset structure and the corresponding rule is saved. If each sample in a subset does not have the same class values, then the algorithm is then executed for the subset as if it were the set. That is, the subset is treated as a set and the process of choosing attributes, sorting into ascending sequence, splitting and producing the information gain is executed.

If during the execution of the above-discussed rules induction algorithm an attribute is encountered which requires the solution of a subproblem to produce a subrule, the subrule is produced in the same manner as previously described. In the preferred embodiment, the subproblems which appear in the primary problem are rule induced prior to primary problem rule induction, so that when a subproblem indicator is encountered, the rule for that subproblem can be made available immediately. An alternative to performing subproblem induction before primary problem induction, is to temporarily halt rules production based on the primary sample set while a rule is produced for a subproblem sample set. Either the preferred or alternate approach can be applied whenever a particular class value requires the solution of a subproblem. The rules creation process for subproblems which occur for attributes and class values will be discussed in more detail hereinafter.

To illustrate the operation of the rules production algorithm of FIG. 8 using the preferred function, a simple symbolic sample set will be used to generate the appropriate decision tree and the general data structure of the decision tree will also be illustrated. The calculation for the function which is used to classify the samples in a sample set and to inductively create a rule from the sample set will be discussed.

A classification rule or process operation rule, in the form of a decision tree, can be constructed for any collection of C objects. M(C) is defined as the expected information content from a decision tree for the set of C objects where M(C) is defined as:

$$M(C) = - \sum_{i=1}^{N} P_i \log_2 P_i \qquad (1)$$

Where N equals the number of classes that the objects can be divided into, and Pi is the probability of the occurrence of a particular class where Pi is estimated by the relative frequency of the class.

When a particular attribute is chosen as the test attribute the expected information content based on the use of the attribute as the node in the tree and the resultant splitting of the sample set based on that attribute is defined by:

B(C,A)=(Probability that the value of attribute A is
$A_i$) * M(Ci) * 1/Wi  (2)

where $W_i$ is the weight for the particular attribute.

The choice of the attribute for the particular node in the decision tree is the attribute which produces the most information gain which is calculated in accordance with:

Max. Information Content=M(C)−B(C,A)  (3)

A more detailed discussion of this preferred classification procedure can be found in "Machine Learning, An Artificial Intelligence Approach" by Michalski et al, Tioga Publishing Co., Palo Alto, Ca, 1983, in Chapter XV entitled "Learning Efficient Classification Procedures And Their Application to Chess End Games" by J. Ross Quinlan.

Given the following data sample set which includes attributes for height, hair and eyes, and a class which arbitrarily indicates the represented people should fall into one of two groups, and assuming a weight of 1 for each attribute, the above discussed procedure as set forth in FIG. 8 will be performed.

TABLE 1

| Record Number | A1 Height | A2 Hair | A3 Eyes | Class |
|---|---|---|---|---|
| 1 | short | blond | blue | + |
| 2 | tall | blond | brown | − |
| 3 | tall | red | blue | + |
| 4 | short | dark | blue | − |
| 5 | tall | dark | blue | − |
| 6 | tall | blond | blue | + |
| 7 | tall | dark | brown | − |
| 8 | short | blond | brown | − |

Height will be chosen arbitrarily as the attribute for testing. If the data set records are sorted on the height variable into the classifications short and tall the following will result.

TABLE 2

| Record Number | A1 Height | A2 Hair | A3 Eyes | Class |
|---|---|---|---|---|
| 1 | short | blond | blue | + |
| 2 | short | dark | blue | − |
| 3 | short | blond | brown | − |
| 4 | tall | blond | brown | − |
| 5 | tall | red | blue | + |
| 6 | tall | dark | blue | − |
| 7 | tall | blond | blue | + |
| 8 | tall | dark | brown | − |

The information content for a split between the two variables having record numbers 3 and 4 is calculated in accordance with Equation 1 to produce:

$$M(C) = -\tfrac{3}{8}\log_2\tfrac{3}{8} - \tfrac{5}{8}\log_2\tfrac{5}{8} = 0.954 \qquad (4)$$

When the information content for splitting between tall and short is calculated the tall side information content equals:

$$M(\text{tall}) = -2/5 \log_2 2/5 - 3/5\log_2 3/5 = 0.971 \qquad (5)$$

And the information content of the short side is:

$$M(\text{short}) = -\tfrac{1}{3}\log_2\tfrac{1}{3} - \tfrac{2}{3}\log_2\tfrac{2}{3} = 0.918 \qquad (6)$$

The expected information content B(C, height) can be calculated in accordance with Equation 2 and is:

$$B(C,\text{height}) = (\tfrac{5}{8})0.971 + (\tfrac{3}{8})0.918 = 0.951 \qquad (7)$$

Once the expected information content is produced the maximum information content or information gain in accordance with equation 3 can be calculated.

$$\text{Max.Info.Gain(Height)} = 0.954 - 0.951 = 0.003 \qquad (8)$$

When the information content for hair is calculated by sorting the data samples into groups according to the hair attribute and performing Equations 1 and 2:

$$B(C,\text{Hair}) = (\tfrac{3}{8})0 + (\tfrac{1}{8})0 + (4/8)1.0 = 0.5 \qquad (9)$$

resulting in information gain for hair of:

$$\text{Max.Info.Gain(Hair)} = 0.954 - 0.5 = 0.454 \qquad (10)$$

Figure 9:
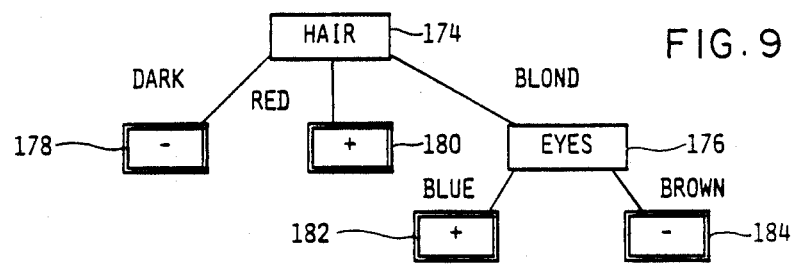
FIG. 9 depicts a simple decision tree produced in accordance with the algorithm of FIG. 8.

In the same way, the maximum information content for the remaining attributes, Eyes, results in Max.Info.Gain(eyes) = 0.047. Reviewing the information gain for the three dependent attributes, hair is the appropriate attribute to be use for dividing the data set into three branches. A decision tree created for the above-discussed example using the classification procedure discussed above is depicted in FIG. 9, where the single line squares indicate attributes and the double line squares indicate the class values, while the labels associated with a particular branch of the tree indicate the value associated with that branch.

Even though a classification algorithm for producing a decision tree by calculating maximum information gain is preferred, other classification algorithms could be used.

The sample data set below is an example of data samples for ten attributes taken from, for example, a chemical plant where the class value is the yield of the process. The asterisk in the data indicate the absence of values for the attributes in the particular records and substitute values, are generated by for example averaging.

TABLE 3

| Record Number | A1 1st Temp | A2 2nd Temp | A3 1st Flow | A4 % Water | A5 1st Ratio | A6 2nd Flow | A7 2nd Ratio | A8 3rd Temp | A9 4th Temp | A10 3rd Flow | Class Yield |
|---|---|---|---|---|---|---|---|---|---|---|---|
| 1 | 134 | 65 | 1.72 | * | 1.84 | 2.73 | 1.48 | 110 | 60 | 2.4 | LOW |
| 2 | 134 | 65 | 1.72 | 23.4 | 1.84 | 2.73 | 1.48 | 109 | 62 | 2.4 | LOW |
| 3 | 135 | 65 | 1.71 | 23.2 | 1.84 | 2.73 | 1.48 | 109 | 63 | 2.4 | OK |
| 4 | 132 | 65 | 1.71 | 24.2 | 1.84 | 2.79 | 1.52 | 109 | 65 | 2.35 | LOW |
| 5 | 128 | 65 | 1.58 | 23.2 | 1.78 | 2.72 | 1.53 | 106 | 65 | 2.28 | LOW |
| 6 | 132 | 65 | 1.74 | 23.2 | 1.84 | 2.67 | 1.45 | 111 | 65 | 2.4 | OK |
| 7 | 132 | 65 | 1.64 | 24 | 1.74 | 2.61 | 1.46 | 109 | 60 | 2.31 | LOW |
| 8 | 134 | 65 | 1.74 | 24 | 1.84 | 2.71 | 1.47 | 110 | 64 | 2.4 | OK |
| 9 | 132 | 65 | 1.73 | * | 1.84 | 3.13 | 1.7 | 105 | 61 | 2.4 | OK |
| 10 | 129 | 65 | 1.74 | 23.9 | 1.84 | 3.07 | 1.67 | 106 | 63 | 2.31 | OK |
| 11 | 130 | 65 | 1.71 | 23.8 | 1.83 | 3.1 | 1.7 | 108 | 67 | 2.28 | OK |
| 12 | 132 | 65 | 1.73 | 23.8 | 1.84 | 2.69 | 1.46 | 108 | 65 | 2.31 | OK |
| 13 | 130 | 65 | 1.73 | 24 | 1.84 | 2.64 | 1.43 | 107 | 65 | 2.3 | LOW |
| 14 | 126 | 65 | 1.74 | 24 | 1.84 | 2.65 | 1.44 | 106 | 65 | 2.3 | LOW |
| 15 | 130 | 65 | 1.74 | 23.8 | 1.84 | 2.65 | 1.44 | 107 | 65 | 2.3 | OK |
| 16 | 130 | 65 | 1.74 | 24.4 | 1.84 | 2.65 | 1.44 | 107 | 65 | 2.3 | OK |
| 17 | 131 | 65 | 1.73 | * | 1.83 | 2.64 | 1.44 | 108 | 65 | 2.29 | OK |
| 18 | 131 | 65 | 1.74 | 24.6 | 1.84 | 2.69 | 1.46 | 109 | 65 | 2.31 | OK |
| 19 | 132 | 65 | 1.73 | 23.9 | 1.84 | 2.64 | 1.43 | 108 | 65 | 2.31 | OK |

Applying the rules production strategy previously discussed to the above-mentioned data (Table 3) set by sorting on each of the attributes and calculating the information gain for each attribute while assuming equal weights for the attributes produces the following:

Information Content M=0.94

|  | A1 | A2 | A3 | A4 | A5 | A6 | A7 | A8 | A9 | A10 |
|---|---|---|---|---|---|---|---|---|---|---|
| Inf.Gain. | .16 | .00 | .22 | .05 | .16 | .11 | .11 | .03 | .16 | .01 |

As can be seen the attribute which should be used for the binary split is the A3 attribute because the information gain obtained by splitting on the A3 attribute is the highest (0.22). The split value within the attribute providing the highest information gain is 1.725, so that all the records with an A3 attribute less than 1.725 are grouped into one subset and all other records are grouped into another subset.

Figure 10:
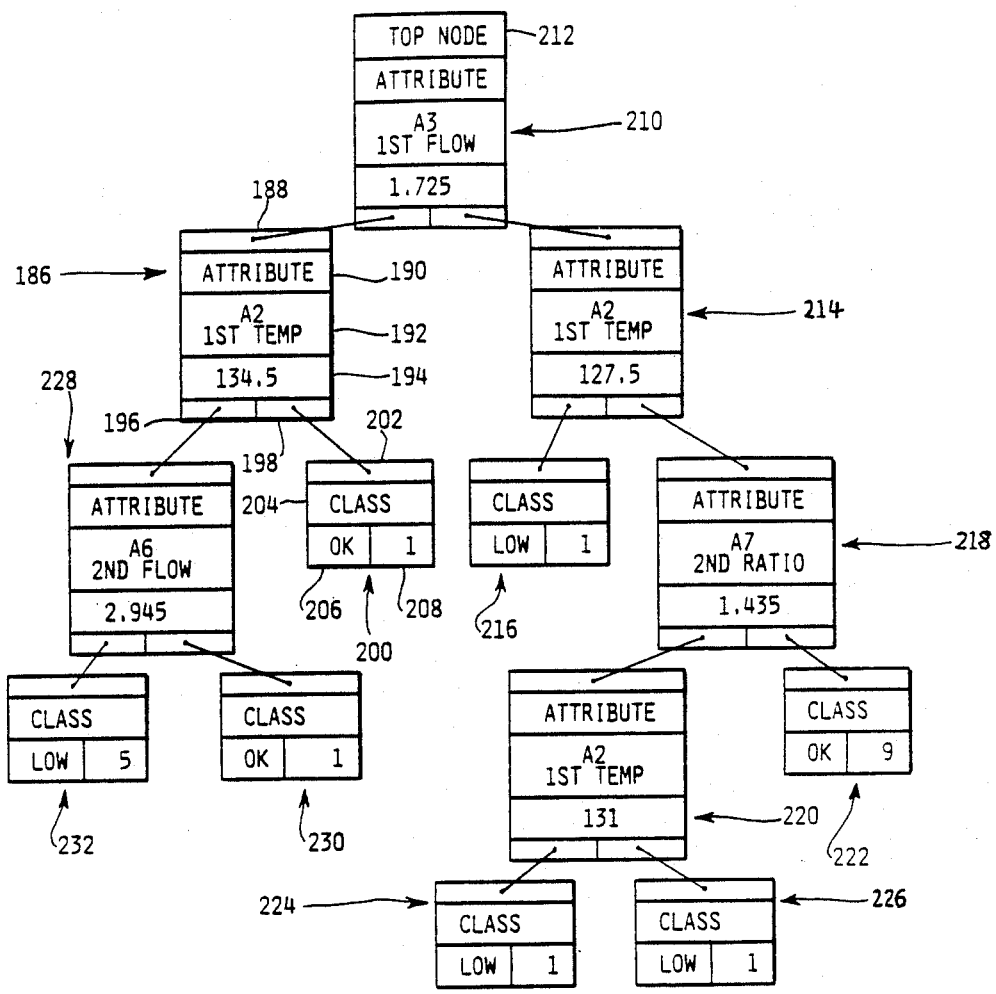
FIG. 10 is a decision tree including an example of the data structure for a tree produced in accordance with the present invention for a process control plant such as a chemical plant.

When this data set is used to induce the rules a tree with a data structure as illustrated in FIG. 10 is created. Each attribute record in the data structure, for example, record 186, includes a previous record pointer 188, a definition field 190 which indicates whether the record is an attribute record or a class record, an attribute name 192 and a split value 194. Also included are pointers 196 and 198 to the next record associated with the data split. The left-hand pointer points to a subset branch including records with attribute values less than the split value and the right-hand corner points to a subset branch for attribute values greater than or equal to the split value. A class record is different from an attribute record in that the type of the record type 204 is class. Only two other fields are provided, a field 206 for indicating the value of the class and a field 208 for indicating how many records fall within this leaf of the decision tree. The top node in the decision tree includes a top node flag 212 which is used when scanning the tree from the leaves to the top to determine that the top of the tree has been reached and one rule has been produced.

Comparison of the tree of FIG. 10 with the data set of Table 3 illustrates how the present invention ignores those controllable variables (attributes) that are not significant with respect to the goal. The variables that do not contribute do not get entered as part of the decision tree because the information gain for the subset of records associated with that attribute becomes equal to the information content. That is, all the records in the subset, even though they may have different attribute values, have the same class value.

After the tree is completed, several different strategies are available for producing the rules. In addition, several formats for the rule are possible depending upon whether the method of control is automatic or includes human intervention. For example, if the data structure of the FIG. 10 is used to produce a top down rule which indicates both positive rules (rules which, if followed, will result in goal accomplishment) and negative rules (rules which indicate the setting for control variables which will not result in goal satisfaction). The following rule will result:

IF 1ST FLOW IS:
 <1.725, THEN IF 1ST TEMP IS:
  <134.5, THEN IF 2ND FLOW IS:
   <2.945, THEN THE YIELD IS LOW
   ≧2.945, THEN THE YIELD IS OK
  >=134.5, THEN THE YIELD IS OK
 <=1.725, THEN IF 1ST TEMP IS:
  <127.5, THEN THE YIELD IS LOW
  >=127.5, THEN IF 2ND RATIO:
   <1.435, THEN IF 1ST TEMP IS:
    <131.0, THEN THE YIELD IS LOW
    >=131.0, THEN THE YIELD IS OK
   >=1.435, THEN THE YIELD IS OK

The above rule would be appropriate in a process that does not include a control unit 30, where an operator must set the control settings. This rule indicates to the operator which settings will provide a bad yield and thus should be avoided.

Another rules production strategy suitable for a completely automated process, that does contain a control unit 30, generates the rules by starting only at the leaves of the decision tree which indicate goal satisfaction and traversing up the tree until the top node is reached and storing the settings for the control variables as the tree is bottom to top traversed. Such a set of rules produced by a traverse traversal of FIG. 10 is illustrated below:

Rule 1 A6≧2.945, A2<134.5, A3<1.725
Rule 2 A2≧134.5, A3<1.725
Rule 3 A2≧131, A7<1.435, A2≧127.5, A3≧1.725
Rule 4 A7≧1.435, A2≧237.5, A3≧1.725

After the constraints of the system (See FIG. 6) are used to eliminate the inappropriate rules and the rules necessary to reach other possible goals are also considered, and after additional rules are further discarded because of particular setting change control strategies, a single rule can be used to actually set the controllable variables in the process by the process control unit 30 of FIG. 1. For example, if after the rule elimination process Rule 2 remains then the first temperature (A2) would be set greater than 134.4 degrees and the first flow (A3) at less than 1.725.

The following data set (Table 4) is an example of the application of the present invention to a financial analysis system whereby determinations are made concerning whether loans should be granted. Such a sample set can be produced by obtaining case histories from a credit agency, including examples of loans for both good and bad customers, and assigning as attributes all the variables considered by loan managers in granting a loan. This example includes the solution of a subproblem associated with determining the value of an attribute and a subproblem for determining the value of a class.

TABLE 4

| RECORD NUMBER | A1 BANK-REF | A2 SUPP-REF | A3 CBR | A4 CLOSE-HELD | A5 # PRINCIPS | CLASS |
|---|---|---|---|---|---|---|
| 1 | FAV | FAV | FAV | NO | * | FAV |
| 2 | FAV | FAV | FAV | YES | FAV | FAV |
| 3 | UNF | UNF | UNF | * | * | UNF |
| 4 | FAV | FAV | FAV | YES | UNF | UNF |
| 5 | FAV | FAV | UNF | NO | * | FAV |
| 6 | FAV | UNF | FAV | NO | * | # FSE |
| 7 | FAV | UNF | UNF | NO | * | UNF |
| 8 | UNF | FAV | FAV | * | * | UNF |

TABLE 4-continued

| RECORD NUMBER | A1 BANK-REF | A2 SUPP-REF | A3 CBR | A4 CLOSE-HELD | A5 # PRINCIPS | CLASS |
|---|---|---|---|---|---|---|
| 9 | FAV | FAV | UNF | YES | FAV | FAV |
| 10 | FAV | FAV | UNF | YES | UNF | UNF |
| 11 | FAV | UNF | FAV | YES | FAV | FAV |
| 12 | FAV | UNF | FAV | YES | UNF | UNF |

The primary data set of Table 4 from which the principle rule for granting the loan illustrated above includes five attributes. The values of the first attribute A1 indicate whether or not a bank reference is favorable or unfavorable. The values of the second attribute A2 indicate whether the supplier reference for the company is favorable and the third attribute A3 value indicates whether the credit bureau rating is favorable. The fourth attribute A4 indicates whether a company is a closely held company and the fifth attribute A5, by using the pound sign in front of the attribute, indicates that this is an attribute subproblem that must be evaluated to determine the credit ratings of the principals in a closely held company. The class represents the overall evaluation and thus whether or not the loan should be granted. In the class column for record six the pound sign associated with the name indicates that a class subproblem must be solved to determine the rules for obtaining the class value of a further supplier evaluation (FSE).

The subproblem data set for evaluating the principals in a closely held company is as follows:

TABLE 5

| RECORD | A1 BANK-REF | A2 CBR | CLASS |
|---|---|---|---|
| 1 | FAV | FAV | FAV |
| 2 | UNF | FAV | UNF |
| 3 | FAV | UNF | UNF |

The definitions of the attributes A1 and A2 in Table 5 have already been defined. The subproblem data set for evaluating the further supplier evaluation class subproblem is as follows:

TABLE 6

| RECORD NUMBER | A1 COMMON IN INDUSTRY | A2 STILL-SUPP CUSTOMER | CLASS |
|---|---|---|---|
| 1 | YES | YES | FAV |
| 2 | NO | NO | UNF |
| 3 | NO | YES | FAV |
| 4 | YES | NO | FAV |

Attribute A1 indicates whether the situation is common in the industry and attribute A2 indicates whether the supplier still supplies the customer.

When executing the algorithms of the present invention using the data sets (Tables 4-6) listed above, whenever a subproblem is encountered the subproblem rule is retrieved. The subproblem, in the alternative, can act like a subroutine call which returns a rule for the class or attribute making the call. During the subproblem execution, the rule is generated in the same manner as in a principle data set. The execution of the algorithms of the present invention results in a decision tree as illustrated in FIG. 11. For simplicity purposes this decision tree does not illustrate the record formats and pointers for the various nodes in the decision tree. If this decision tree is used to generate a primary rule, a rule for principals in a closely held corporation and a rule for a further supplier evaluations the following rules will result. The format of these rules allows people in a credit department of a corporation or bank to determine whether or not to grant a loan.

---
PRIMARY RULE
---
IF BANK-REF IS:
    FAV, THEN IF SUPP-REF IS:
        FAV, THEN IF CLOSE-HELD IS:
            NO, THEN THE EVALUATION IS FAV 2
            YES, THEN IF #PRINCIPS IS:
                FAV, THEN THE EVALUATION IS FAV 2
                UNF, THEN THE EVALUATION IS UNF 2
        UNF, THEN IF CRB IS:
            FAV, THEN IF CLOSE-HELD IS:
                NO, THEN THE EVALUATION IS #FSE 1
                YES, THEN IF #PRINCIPS IS:
            UNF, THEN THE EVALUATION IS UNF 1
    UNF, THEN THE EVALUATION IS UNF 2
        RULE FOR PRINCIPLES IN
        A CLOSELY HELD COMPANY
---
IF BANK-REF IS:
    FAV, THEN IF CBR IS:
        FAV, THEN THE EVALUATION IS FAV 1
        UNF, THEN THE EVALUATION IS UNF 1
    UNF, THEN THE EVALUATION IS UNF 1
    RULE FOR FURTHER SUPPLIER EVALUATION
---
IF COMMON IS:
    YES, THEN THE FSE IS FAV 2
    NO, THEN IF STILL-SUPP IS:
        YES, THEN THE FSE IS FAV 1
        NO, THEN THE FSE IS UNF 1
---

The control settings in the above rules for a loan analysis are the attribute values, favorable or unfavorable, for each branch of the rule/decision tree. The rules produced include both the negative and positive rules so that bad loans can be eliminated. In automating a financial process as discussed above, the rules could be used to generate questions for the loan manager based on the attribute values for each branch, for example, "What is the bank reference? (favorable/unfavorable)". The answers would then be used to traverse the tree until a class value indicating whether the loan should be granted is encountered.

A new sample can be collected and a new rule produced for such a financial analysis system whenever a loan is granted based on an existing rule and the loan subsequently goes into default. The sample would include the particular attribute values for that loan and a class value of unfavorable. A new rule would be generated which would cover the latest criteria in discovering problem loans as well as the prior problem loans.

As can be seen from the prior discussion, the present invention provides a process control system which develops rules for governing the process which are themselves adaptive over time to changing conditions in the process itself. The rules developed also allow the process to be fine tuned for the particular goal and for economic as well as other considerations. Fine tuning can be performed by making minor perturbations in the controllable variables and sampling when progress toward the goal is made.

When applying this system to a process to be controlled, the portion of the system which evaluates the data sets and induces the necessary rules can be an IBM PC XT or AT if it includes an 8087 or 80827 math comprocessor. The minimum memory requirements is 320K with additional memory requirements being dictated by the number of samples in the sample data set and the number of attributes in each sample. If the number of samples times the number of attributes equals 1000 approximately 64K of additional memory will be required. If an interpreted LISP language is used, the induction of rules for a problem having 12 data samples and 5 attributes takes approximately 10 seconds. If a compiled LISP language is used or another language such a C or PASCAL, the execution would be an order of magnitude faster. If even faster execution and rules production is necessary, a faster processor with expanded mathematic capability and memory will be necessary. Thus, when applying the present invention to a particular process, consideration must be given to the number of attributes and the cycle time necessary to produce a control rule.

The many features and advantages of the present invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

We claim:

1. A method of controlling a process having a process goal and control settings, comprising the steps of:
   (a) operating the process at current settings in accordance with a current rule;
   (b) sampling the process and determining whether a current sample representing a current state of the process is predicted by the current rule;
   (c) inducing a new rule when the sample is not predicted by the current rule and combining the current rule with the new rule to produce a combined rule;
   (d) changing the control settings in accordance with the combined rule when the combined rule will move the process toward the goal; and
   (e) operating the process at the changed control settings.

2. A method as recited in claim 1, wherein step (b) comprises the steps of:
   (b1) comparing the current sample goal with a rule goal;
   (b2) discarding the current sample if the current sample goal indicates the rule goal is satisfied; and
   (b3) saving the current sample in a rule sample data set if the current sample goal indicates rule goal is not satisfied.

3. A method as recited in claim 2, wherein step (c) comprises the steps of:
   (c1) applying a classification function to the rule sample data set to produce a decision tree;
   (c2) generating a rule from the decision tree.

4. A process as recited in claim 3, wherein step (c1) comprises the steps of:
   (i) calculating information gain for rule attributes using a weighting factor for each attribute;
   (ii) selecting as a decision tree node the attribute with the greatest information gain;
   (iii) subdividing the rule sample data set into subsets in dependence on the attribute selected; and
   (iv) repeating steps (i)-(iii) for each subset.

5. A process as recited in claim 4 wherein step (c1) includes determining whether rules induction constraints have been met.

6. A process as recited in claim 4, wherein an attribute comprises one of a numeric control variable and a logical control variable.

7. A method as recited in claim 3, wherein step (d) comprises the steps of:
   (d1) discarding rules which do not satisfy the goal;
   (d2) discarding rules which do not satisfy system constraints;
   (d3) selecting a rule which allows improvements in the goal; and
   (d4) changing the control settings in accordance with a change control strategy for the rule selected.

8. A process control system apparatus using control settings and having a process goal, comprising:
   process sensing means for sensing values of controllable variables in the process;
   process control means for controlling the process in dependence on the control settings; and
   control setting means for controlling the process in dependence on a current control rule having current control settings, inducing a substitute control rule including substitute control settings replacing the current control rule and current control settings when a data sample of the controllable variables is not predicted by the current control rule and outputting the substitute control settings to said process control means to control the process when the substitute control settings will move the process toward the goal.

9. An apparatus as recited in claim 8, wherein said control setting means stores plural data samples and includes:
   classification means for applying a classification function to the data samples and producing a decision tree; and
   means for generating a rule from the decision tree.

10. An apparatus as recited in claim 9, wherein said classification means includes information gain means for calculating the information gain of each controllable variable using a weighting factor for each variable and selecting attributes for nodes of the tree that provide the greatest information gain.

11. A method of controlling a process having control settings and a goal, comprising the steps of:
   (a) operating the process at current control settings in accordance with a current rule;
   (b) sampling the process and determining whether a current sample representing a current state of the process is predicted by the current rule;
   (c) inducing a new rule if the sample is not predicted by the current rule by applying an information gain classification function to produce a decision tree;
   (d) discarding rules which do not satisfy the goal and control setting change constraints and changing the control settings in accordance with the new rule; and
   (e) operating the process at the changed control settings.

12. A process control system apparatus using control settings and having a process goal, comprising:
   process sensing means for sensing values of controllable variables in the process;
   process control means for controlling the process in dependence on the control settings; and
   control setting means for controlling the process in dependence on a current control rule having current control settings, for inducing a substitute control rule, by applying a classification function to produce a decision tree and including substitute control settings, when a data sample of the controllable variables is not predicted by the current control rule and for outputting the substitute control settings to said process control means to control the process when the substitute control settings will move the process toward the goal.

13. An apparatus as recited in claim 12, wherein said classification means includes information gain means for calculating the information gain of each controllable variable using a weighting factor for each variable and selecting attributes for nodes of the tree that provide the greatest information gain.

* * * * *